US011719256B2

(12) United States Patent
Wang et al.

(10) Patent No.: US 11,719,256 B2
(45) Date of Patent: Aug. 8, 2023

(54) CENTRIFUGAL FAN AND TERMINAL

(71) Applicant: Huawei Technologies Co., Ltd., Shenzhen (CN)

(72) Inventors: Jianliang Wang, Dongguan (CN); Liujun Zou, Shenzhen (CN); Jian Shi, Shanghai (CN); Zhiguo Zhang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 175 days.

(21) Appl. No.: 17/408,278

(22) Filed: Aug. 20, 2021

(65) Prior Publication Data

US 2021/0388849 A1   Dec. 16, 2021

Related U.S. Application Data

(63) Continuation of application No. PCT/CN2019/104770, filed on Sep. 6, 2019.

(30) Foreign Application Priority Data

Feb. 20, 2019   (CN) .......................... 201910127434.0

(51) Int. Cl.
*F01D 1/02*       (2006.01)
*F04D 29/44*    (2006.01)
*F04D 17/16*    (2006.01)
*F04D 29/42*    (2006.01)
*G06F 1/20*       (2006.01)

(52) U.S. Cl.
CPC ........... *F04D 29/441* (2013.01); *F04D 17/16* (2013.01); *F04D 29/4226* (2013.01); *G06F 1/203* (2013.01)

(58) Field of Classification Search
CPC .. F04D 29/4226; F04D 17/16; F04D 25/0613; F04D 29/162; F24F 1/0022
USPC ....................................................... 415/185.1
See application file for complete search history.

(56) References Cited

U.S. PATENT DOCUMENTS

| 4,917,572 A * | 4/1990 | Van Houten ............ F04D 17/16 |
| | | 415/206 |
| 9,039,360 B2 * | 5/2015 | Fukuda ................ F04D 29/4226 |
| | | 415/204 |
| 2002/0131861 A1 | 9/2002 | Sakai et al. |

(Continued)

FOREIGN PATENT DOCUMENTS

| CN | 101832280 A | 9/2010 |
| CN | 102562618 A | 7/2012 |

(Continued)

*Primary Examiner* — Long T Tran
*Assistant Examiner* — James J Kim
(74) *Attorney, Agent, or Firm* — Conley Rose, P.C.

(57) ABSTRACT

A centrifugal fan includes a housing configured to accommodate an impeller. The impeller rotates relative to the housing. A flow channel that cooperates with the impeller is disposed in the housing. The flow channel includes a pressurization area, in which a static pressure and a flow velocity of an air flow are gradually increased along a rotation direction of the impeller. However, an air inlet is disposed on the housing, and there is a specific gap between the impeller and the air inlet. As a result, when air flows through the pressurization area, there is a specific amount of leakage through the gap. Therefore, an air baffle ring is disposed in the centrifugal fan provided in this application.

20 Claims, 6 Drawing Sheets

(56) References Cited

U.S. PATENT DOCUMENTS

| | | | |
|---|---|---|---|
| 2005/0260069 A1 | 11/2005 | Hsu et al. | |
| 2009/0067991 A1* | 3/2009 | Hwang | F04D 25/0613 |
| | | | 415/203 |
| 2010/0230076 A1 | 9/2010 | Yang et al. | |
| 2011/0189004 A1 | 8/2011 | Dybenko et al. | |
| 2015/0110615 A1* | 4/2015 | Lin | F04D 17/16 |
| | | | 415/203 |
| 2015/0198178 A1* | 7/2015 | Kawasaki | F04D 29/441 |
| | | | 415/119 |
| 2018/0187694 A1* | 7/2018 | Yamaguchi | F04D 17/16 |
| 2020/0200187 A1 | 6/2020 | Weinzierl et al. | |

FOREIGN PATENT DOCUMENTS

| | | |
|---|---|---|
| CN | 104847692 A | 8/2015 |
| JP | 2006029312 A | 2/2006 |
| WO | 2014167707 A1 | 10/2014 |
| WO | 2019015946 A2 | 1/2019 |

* cited by examiner

CENTRIFUGAL FAN AND TERMINAL

CROSS-REFERENCE TO RELATED APPLICATION

This application is a continuation of International Patent Application No. PCT/CN2019/104770, filed on Sep. 6, 2019, which claims priority to Chinese Patent Application No. 201910127434.0, filed on Feb. 20, 2019. The disclosures of the aforementioned applications are hereby incorporated by reference in their entireties.

TECHNICAL FIELD

This application relates to the field of terminal technologies, and in particular, to a centrifugal fan and a terminal.

BACKGROUND

Terminal products such as laptop computers and tablets are required to be lighter and thinner due to user requirements for a light weight and small thickness, and need to have good heat dissipation performance to provide relatively good temperature experience. In other words, when noise generated in a fan-in-system scenario is the same as that in a free-field scenario, it is expected that an air volume of a fan is larger. In this way, fans of a same size can take away more heat when generating same noise, thereby improving heat dissipation performance of a system or allowing larger chip power consumption. However, conventional fans cannot meet heat dissipation requirements of terminal products such as laptop computers and tablets due to a relatively small air supply volume.

SUMMARY

This application provides a centrifugal fan and a terminal, to increase an air volume of a fan.

According to a first aspect, a centrifugal fan is provided. The centrifugal fan is applied to a terminal. During disposition, the centrifugal fan includes a housing. The housing is configured to accommodate an impeller. During disposition of the impeller, the impeller is connected to the housing in a rotatable manner. A flow channel that cooperates with the impeller is disposed in the housing. The flow channel is a space between the housing and the impeller. In addition, for the centrifugal fan, the flow channel of the centrifugal fan includes a pressurization area. A static pressure and a flow velocity of an air flow are gradually increased in the pressurization area along a rotation direction of the impeller, in order to improve an air supply effect by increasing a pressure of air supply. However, an air inlet is disposed on the housing, and there is a specific gap between the impeller and the air inlet. As a result, when air flows through the pressurization area, there is a specific amount of leakage through the gap between the air inlet and the impeller, and the leaked air flow mixes with an air flow inhaled through the air inlet. Consequently, an air flow loss is caused. This reduces an overall air volume of the fan, and increases noise of the fan. Therefore, in the centrifugal fan provided in this application, an air baffle ring that prevents air in the pressurization area from leaking through the air inlet is further disposed in the housing. The air baffle ring is disposed around a part of the air inlet, to prevent air in the pressurization area from leaking, and separate air in the pressurization area from air at the air inlet, thereby increasing a pressurization effect, and reducing a loss caused by mixture of an incoming air flow and a pressurization air flow in a volute (the housing). In this way, an air volume of the fan is increased, and noise of the fan is reduced.

During disposition of the air baffle ring, the air baffle ring is disposed around a part of the air inlet, and no air baffle ring is disposed in a release area of the fan. In this part, a static pressure is relatively low, and an inhaled air flow is relatively large. Keeping a relatively large gap value between the housing and the impeller can reduce inflow resistance, and facilitate smooth entering of more air flows. Compared with a conventional design, the air baffle ring that is disposed around a part of the air inlet in the present disclosure includes two parts: a relatively small gap of the pressurization area; and a relatively large gap of the release area. In the pressurization area, an air flow at the air inlet can be effectively isolated from a pressurization air flow, and in the release area, the relatively large gap can ensure inhaling of more air flows. A combination of improvements of the two parts makes the design achieve a quite good improvement effect.

During disposition of the air baffle ring, the air baffle ring is a C-shaped air baffle ring, and a concave side of the C-shaped air baffle ring faces the air inlet to effectively isolate an air flow at the air inlet from an air flow in the pressurization area of the fan. Additionally, a curve of the air baffle ring surrounds only a part of the air inlet to match the pressurization area, and ends in the release area to ensure that a relatively large gap is kept between the housing and the impeller of the release area, thereby reducing air flow inhalation resistance in the release area.

During disposition of the air baffle ring, the air baffle ring is disposed in the housing and protrudes toward one side of the impeller. Therefore, a spacing between the impeller and the housing is reduced, thereby reducing an amount of air leakage.

During disposition of the air baffle ring, an integrated structure may be used to form the air baffle ring, or a plurality of baffle blocks may be arranged at intervals to form the air baffle ring. Either manner can be used to prevent air flow leakage and mixture in the pressurization area and reduce air flow inhalation resistance in the release area.

For example, the air baffle ring may be formed using an integrated structure or separated structures of the air baffle ring and the housing. When an integrated structure is used, the air baffle ring and the housing are one integrated whole in structure. To be more specific, when the housing is being made, the air baffle ring is directly formed on the housing. In this case, the air baffle ring is a bending structure that is disposed around the air inlet on the housing and that bends toward the interior of the housing. That is, a structure that concaves toward the interior of the housing is formed through bending, thereby preventing leakage of air in the pressurization area. During bending, the air baffle ring may be bent along an edge of the air inlet, or there may be a distance between a bending position and the air inlet.

When separated structures are used, the air baffle ring is fixedly connected to the housing. For example, the air baffle ring may be connected to the housing through welding or bonding or using a threaded connecting piece, to be relatively fixed to the housing.

For a fan device with a rotation part, the impeller has runout during rotation, and a specific gap needs to be reserved between the impeller and the housing. If the gap is excessively small, scratching may be caused. If the gap is excessively large, a relatively large amount of leakage may be caused, and consequently, pressurization cannot be effectively performed, and work cannot be done on an air flow.

A larger radius between a rotation axis and the gap indicates larger runout. In an area with a relatively small radius from the axis, the gap may be reduced properly. Therefore, in a direction parallel to the air inlet, a maximum spacing between the air baffle ring and the edge of the air inlet provided in this embodiment of this application is less than a maximum spacing between a fan blade of the impeller and the air inlet. In this way, the added air baffle ring can be prevented from affecting swing of the impeller. In addition, the air baffle ring is disposed at an edge of the housing. Therefore, a gap between the impeller and the housing can still ensure that a conventional design remains unchanged, such that an inner-side runout allowance is fully used. This can be easily implemented, provides a relatively good effect, and facilitates mass production.

Moreover, for a width of the air baffle ring, the air baffle ring is an air baffle ring with a fixed width or a gradually changing width. That is, the air baffle ring may have a fixed width, a gradually increasing or gradually decreasing width, or a width that is alternately wide and narrow.

A volute tongue is disposed in the centrifugal fan. During disposition, the volute tongue is disposed in a side wall of the housing. During disposition of the air baffle ring, one end of the air baffle ring is located on one side on which a connection line between a center of the volute tongue and a center of the impeller is away from the pressurization area. This prevents the added air baffle ring from affecting an air intake effect.

During disposition of the centrifugal fan, an air outlet is disposed on the housing; an area, of the flow channel, close to the air outlet is the release area; and the release area communicates with the pressurization area. Air flows into the release area after flowing through the pressurization area, and flows out of the centrifugal fan from the release area. The other end of the air baffle ring is located on one side, of the release area, close to the pressurization area. This prevents the added air baffle ring from affecting an air exhaust effect.

To further improve the air exhaust effect, a notch corresponding to the release area is disposed on the housing. In this way, an air intake volume in the release area is increased, and the air exhaust effect is improved.

During disposition of the air baffle ring, one end, of the air baffle ring, close to the volute tongue has a guide surface. This improves smoothness of air circulation.

During disposition of the air inlet, the housing includes an upper cover plate and a lower cover plate that are disposed opposite to each other, and a side wall configured to connect the upper cover plate and the lower cover plate. The upper cover plate, the lower cover plate, and the side wall form a cavity for accommodating the impeller. The air inlet is disposed on the upper cover plate and/or the lower cover plate, and the air baffle ring is fixedly disposed on the upper cover plate and/or the lower cover plate. In this way, an air intake effect of the entire impeller is improved.

According to a second aspect, a terminal is provided. The terminal includes the terminal itself, a chip disposed in the terminal, and the centrifugal fan according to any one of the first aspect or the foregoing implementations of the first aspect, where the centrifugal fan is disposed in the terminal and is configured to dissipate heat for the chip. An air intake effect of the terminal is improved using the disposed centrifugal fan.

DESCRIPTION OF EMBODIMENTS

To make objectives, technical solutions, and advantages of this application clearer, the following further describes this application in detail with reference to accompanying drawings.

To facilitate understanding of a centrifugal fan provided in embodiments of this application, an application environment of the centrifugal fan is first described. The centrifugal fan is applied to a terminal, for example, a laptop computer or a tablet computer. Certainly, the centrifugal fan may alternatively be a device on another common terminal. In use, the centrifugal fan is disposed in the terminal and is configured to dissipate heat for the terminal.

Figure 1:
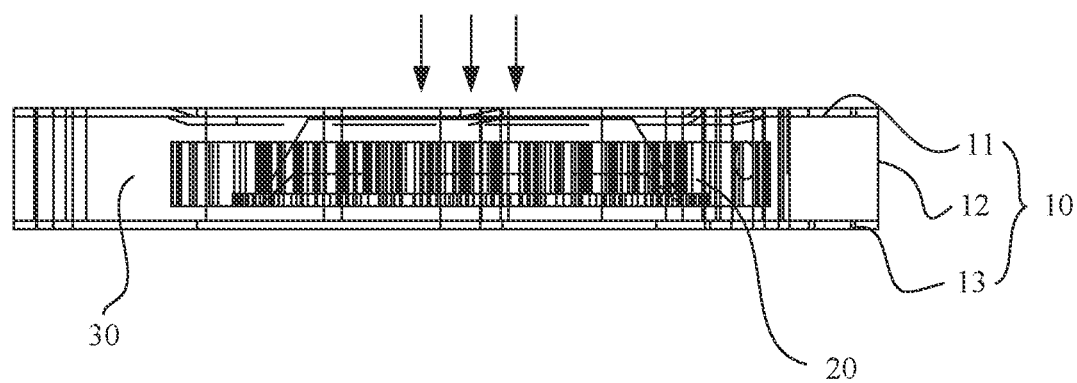
FIG. 1 is a section view of a centrifugal fan according to an embodiment of this application.

A basic structure of a centrifugal fan provided in an embodiment of this application is first described. As shown in FIG. 1, the centrifugal fan includes a housing 10, and the housing 10 has a hollow cavity configured to accommodate an impeller 20. During disposition, the impeller 20 is disposed in the housing 10, and can rotate relative to the housing 10. In addition, the housing 10 is provided with an air inlet 50 and an air outlet that cooperate with the impeller 20. For ease of description, two opposite surfaces, namely a first surface and a second surface, are first introduced. The first surface and the second surface are perpendicular to an axis of the impeller 20, and the air inlet 50 is disposed on the first surface or the second surface. When there is one air inlet 50, the air inlet 50 is disposed on the first surface or the second surface. When there are two air inlets 50, each of the first surface and the second surface is provided with one air inlet 50. The air outlet is disposed on a side wall 12 between the first surface and the second surface. Moreover, there is a gap between the housing 10 and the impeller 20. The gap communicates with each of the air inlet 50 and the air outlet, such that the gap is used as a flow channel 30 for air circulation. In use, under the action of the impeller 20, air flows from the air inlet 50, then flows through the flow channel 30, and finally flows out from the air outlet.

When being formed, the housing 10 may be directly formed through injection molding as one structure, or may be formed by meshing separated structures together. When separated structures are used, the housing 10 includes two cover plates: an upper cover plate 11 and a lower cover plate 13. In addition, the housing 10 further includes a side wall 12. The upper cover plate 11 and the lower cover plate 13 are disposed opposite to each other, and the side wall 12 is fixedly connected to each of the upper cover plate 11 and the lower cover plate 13, in order to form the housing 10 that accommodates the impeller 20. In addition, a gap between the upper cover plate 11 and the impeller 20, a gap between the lower cover plate 13 and the impeller 20, and a gap between the side wall 12 and the impeller 20 form the flow channel 30 of the centrifugal fan. In the structure shown in FIG. 1, there is one air inlet 50, and the air inlet 50 is disposed on the upper cover plate 11. However, it should be understood that there may be one or two air inlets provided in this embodiment of this application. When one air inlet 50 is used, the air inlet 50 may be disposed on the upper cover plate 11, or may be disposed on the lower cover plate 13. When two air inlets are used, each of the upper cover plate 11 and the lower cover plate 13 is provided with one air inlet 50. However, regardless of which cover plate is provided with the air inlet, a structure form is the same. Therefore, an example in which the air inlet 50 is disposed on the upper cover plate 11 is used for description. In addition, when the air outlet is disposed, the air outlet is located on the side wall 12.

Figure 2:
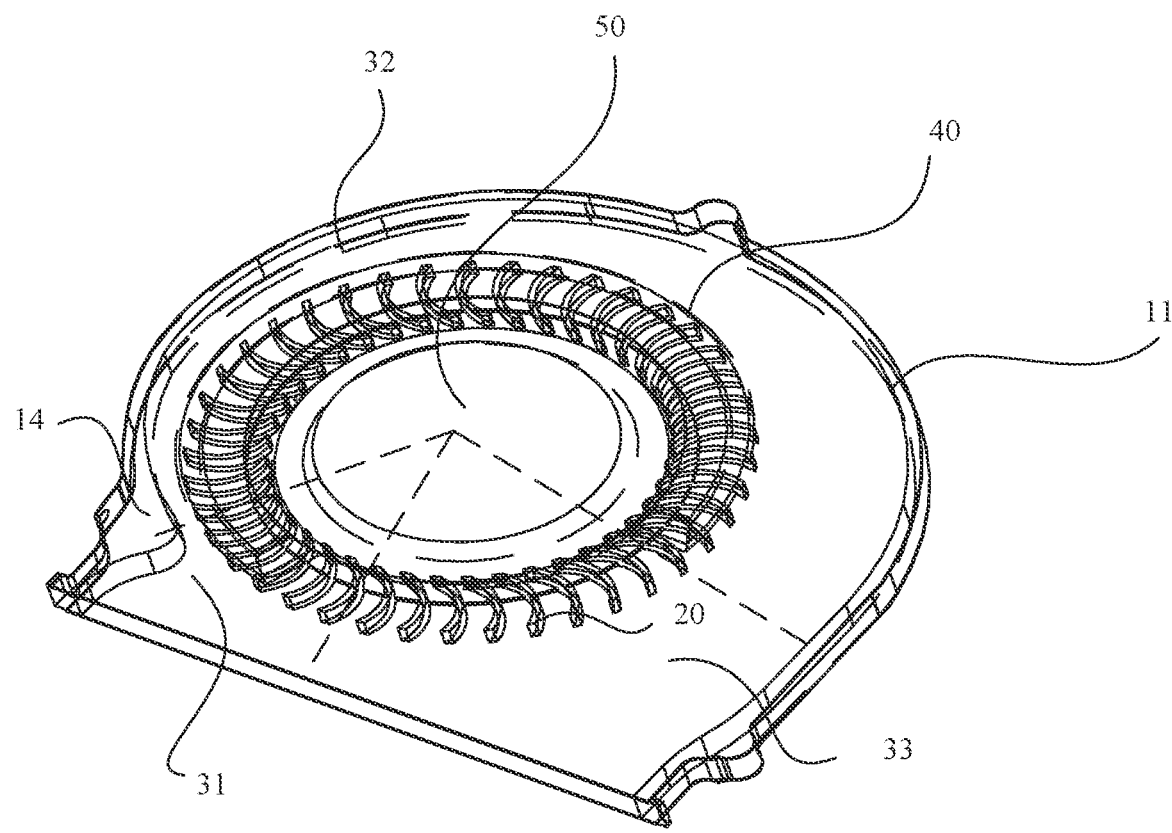
FIG. 2 is a schematic structural diagram of a centrifugal fan according to an embodiment of this application.

When the impeller 20 is rotating, air is drawn from the air inlet 50 into the flow channel 30 of the housing 10. Therefore, a low-pressure area is formed at the air inlet 50. For ease of description, space in the housing 10 is divided. Along an air flow direction, the flow channel 30 in the housing 10 is divided into a volute tongue air intake area 31, a pressurization area 32, and a release area 33 communicating with each other. Three dashed auxiliary lines shown in FIG. 2 divide the flow channel 30 into three areas. An area, of the flow channel 30, corresponding to the air inlet 50 is the volute tongue air intake area 31. An area, of the flow channel 30, close to the air outlet is the release area 33. An area between the volute tongue air intake area 31 and the release area 33 is the pressurization area 32. When air enters the housing 10 through the air inlet 50, the air moves outwards from a center due to rotation of the impeller 20, and gradually accelerates under the work of the impeller 20. A part of the air flow is swept by the impeller 20 to the volute tongue air intake area 31, and then enters the pressurization area 32 along the impeller 20. In the pressurization area 32, a static pressure and a flow velocity of the air flow are gradually increased along a rotation direction of the impeller 20, and a part of a pressure of pressurized air is greater than that in the low-pressure area at the air inlet 50. Then the air continues to flow to the release area 33 in the flow channel 30. The release area 33 is located near the air outlet, and because air at this location flows out from the air outlet, a pressure of the air in this area is lower than that in the low-pressure area at the air inlet 50. It can be learned from the foregoing descriptions that, in an air supply process, air undergoes a pressurization process and a depressurization process, and because there needs to be a specific gap (as shown in FIG. 2) between the impeller 20 and the housing 10 during disposition, the air inlet 50 communicates with the pressurization area 32 when the air inlet 50 is disposed on the housing 10. As a result, a part of air with a relatively high pressure flows out from the pressurization area 32 to leak, and the outflowing high-pressure gas mixes with an incoming air flow from the air inlet 50, leading to a fluid loss. This reduces an air supply volume and increases noise.

To improve an air supply effect, an air baffle ring 40 is added to the centrifugal fan provided in this embodiment of this application. The air baffle ring 40 is configured to reduce leakage of air in the pressurization area 32 from the pressurization area 32 to the air inlet. As such, a high-pressure air flow in the pressurization area 32 is effectively isolated from a low-pressure air flow at the air inlet. This ensures a pressurization effect of the pressurization area 32, and reduces leakage and a loss that is caused by air flow mixture, thereby improving an air volume of the fan. During disposition of the air baffle ring 40, the air baffle ring 40 is disposed on the housing 10 and around a part of the air inlet 50. As shown in FIG. 2, the air inlet 50 shown in this embodiment of this application is a circular air inlet 50, and the correspondingly disposed air baffle ring 40 is a C-shaped ring. In addition, during disposition, a concave side of the C-shaped air baffle ring 40 faces the air inlet 50. During disposition of the air baffle ring 40, the air baffle ring 40 may be disposed concentrically with the air inlet 50. Certainly, the C-shaped ring 40 and the air inlet 50 may be alternatively disposed in a non-concentric manner. In addition, a connection between the air baffle ring 40 and the housing 10 may be implemented using different structure forms, to be more specific, may be implemented using an integrated structure or separated structures. The following describes the structure forms one by one.

Figure 3:
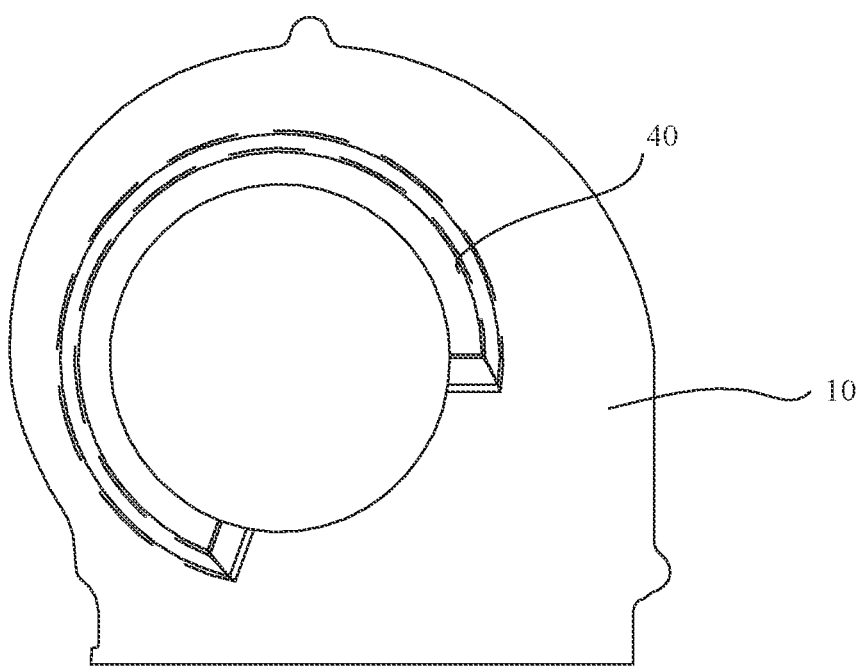
FIG. 3 is a schematic structural diagram of an air baffle ring of a centrifugal fan according to an embodiment of this application.
Figure 4:
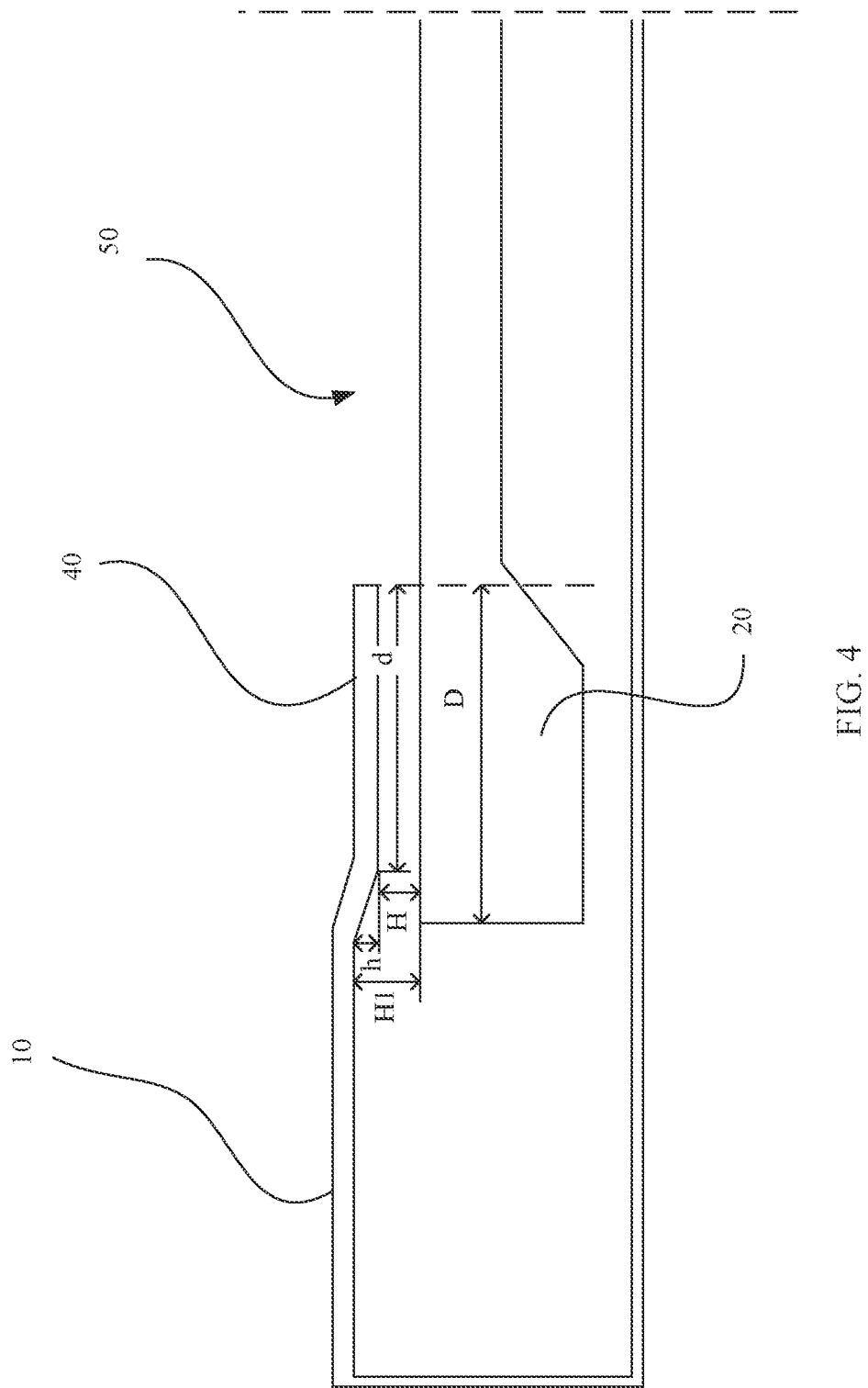
FIG. 4 is a schematic structural diagram of an air baffle ring of a centrifugal fan according to an embodiment of this application.

First referring to FIG. 3, in a structure shown in FIG. 3, an air baffle ring 40 and a housing 10 are of an integrated structure. Using the structure shown in FIG. 3 as an example, in the structure shown in FIG. 3, an air inlet 50 is disposed on an upper cover plate 11. Therefore, the air baffle ring 40 is also disposed on the upper cover plate 11, and is formed integrally with the upper cover plate 11. During production, different processes may be selected based on a material of the upper cover plate 11. For example, the upper cover plate 11 is formed through plastic injection molding. In this case, during forming of the air baffle ring 40, a C-shaped structure that is concaved toward the interior of the housing 10 is formed on the upper cover plate 11 through injection molding to surround the air inlet 50. When the upper cover plate 11 is produced using a metal material, during forming of the air baffle ring 40, the air baffle ring 40 may be directly formed on the upper cover plate 11 through stamping or bending. Regardless of which manner is used, the air baffle ring 40 may be tightly adjacent to an edge of the air inlet 50, or may be at a distance from the air inlet 50. It should be understood that, the air baffle ring 40 described above has a specific width d. However, the air baffle ring 40 provided in this embodiment of this application may have a width as small as possible. For example, when the housing 10 is produced using a metal material, the air baffle ring 40 may be formed by bending an edge of the upper cover plate 11 at the air inlet 50. In this case, a thickness of the air baffle ring 40 is a thickness of the bent edge. In an implementable solution, the air baffle ring 40 has a specific thickness. As shown in FIG. 4, when an air baffle ring 40 is formed by bending a metal material, the bending is an L-shaped bending, and a thickness of the air baffle ring 40 is a width of a horizontal part of the L-shaped bending, such that an amount of air leakage can be reduced, and an eddy flow caused by a sudden change of an air pressure can be avoided. During disposition of the bending, as shown in FIG. 4, a vertical part of the L-shaped bending has a specific inclination angle, to facilitate bending. In addition, the vertical part may be straight or may have a specific radian, for example, the vertical part is a curve, and a convex surface of the curved vertical part faces the interior of the housing 10.

To improve an air intake effect, during disposition of the air baffle ring 40, the air baffle ring 40 is disposed in the housing 10 and protrudes toward one side of the impeller 20. Still referring to FIG. 4, for example, the air baffle ring 40 is disposed on the upper cover plate 11. A spacing between an inner surface of the upper cover plate 11 and a surface, of a fan blade of the impeller 20, facing the upper cover plate 11 is H1, and a thickness of the air baffle ring 40 is h, that is, a height by which the air baffle ring 40 protrudes from the upper cover plate 11. In this case, a gap (a gap between the fan blade and the air baffle ring 40) through which the pressurization area 32 communicates with the air inlet 50 is H, and H=H1−h. The gap through which the pressurization area 32 communicates with the air inlet 50 in this application is smaller than the spacing H1 between the upper cover plate 11 and the fan blade in other approaches by the thickness h of the air baffle ring 40. This reduces air leakage of the pressurization area 32 and improves a pressurization effect.

Still referring to FIG. 3, for a fan device with a rotation part, the impeller 20 has runout during rotation, and a specific gap needs to be reserved between the impeller 20 and the housing 10. If the gap is excessively small, scratching may be caused. If the gap is excessively large, a relatively large amount of leakage may be caused, and consequently, pressurization cannot be effectively performed, and work cannot be done on an air flow. A larger radius between a rotation axis and the gap indicates larger runout. In an area with a relatively small radius from the axis, the gap may be reduced properly. Therefore, in the air baffle ring 40 provided in this embodiment of this application, there is a specific spacing (a width d of the air baffle ring 40) between a convex edge of the air baffle ring 40 and the air inlet 50. The spacing meets the following requirement: Along a direction parallel to the air inlet 50, a maximum spacing between the air baffle ring 40 and the edge of the air inlet 50 is less than a maximum spacing between a fan blade of the impeller 20 and the air inlet 50, that is, a maximum width of the air baffle ring 40 is less than a maximum width of the impeller 20. As shown in FIG. 4, if a maximum spacing between a fan blade of the centrifugal fan and the air inlet 50 is specified as D, d<D. Because an end portion of the fan blade shakes when the fan blade is rotating, during disposition, a maximum position of the air baffle ring 40 does not extend to the end portion of the fan blade, such that there is sufficient space in the housing 10 to allow shaking of the end portion of the fan blade, and the disposed air baffle ring 40 does not interfere with the fan blade. Because the width d of the air baffle ring 40 avoids the end portion of the fan blade, the thickness h of the air baffle ring 40 may be further increased, in order to further improve an air baffle effect.

During forming of the air baffle ring 40, the air baffle ring 40 may be an integrated structure or separated structures. As shown in FIG. 4, the air baffle ring 40 is an integrated structure. In this case, the air baffle ring 40 is a complete C-shaped structure. Certainly, the air baffle ring 40 may alternatively be separated structures. In this case, the air baffle ring 40 is a C-shaped structure formed by a plurality of protrusions. For example, each protrusion is a curved protrusion, and an inner concave surface of the curved protrusion faces the air inlet 50. The plurality of curved protrusions are arranged at intervals around the air inlet 50 to form one C-shaped air baffle ring 40. It should be understood that the air baffle ring 40 is merely an example, and the air baffle ring 40 provided in this embodiment of this application may be produced in another manner.

Figure 5:
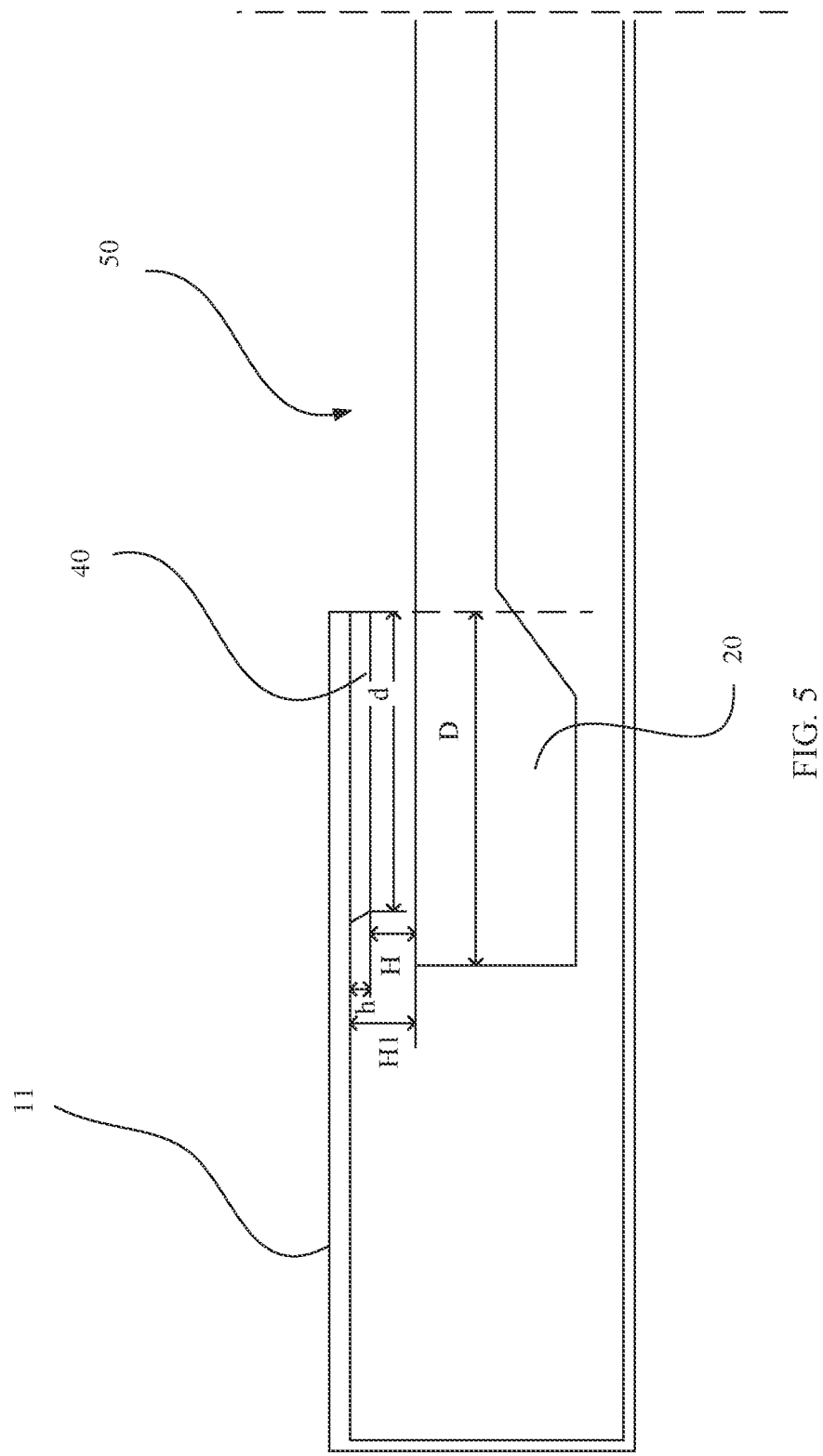
FIG. 5 is a schematic structural diagram of another air baffle ring of a centrifugal fan according to an embodiment of this application.

As shown in FIG. 5, when the air baffle ring 40 and the housing 10 are separated structures, the air baffle ring 40 is fastened to the upper cover plate 11. For example, the air baffle ring 40 may be fastened to the upper cover plate 11 through welding, bonding, or riveting, or using a threaded connecting piece. The threaded connecting piece may be a common threaded connecting piece such as a bolt or a screw. When the air baffle ring 40 and the housing 10 are separated structures, a size and structure described above may also be used. For example, a C-shaped structure may be used, and an integrated structure or separated structures may also be used. Details are not described herein again.

Referring to FIG. 4 and FIG. 5, regardless of which type of air baffle ring 40 described above is used, the width of the air baffle ring 40 may be set based on an actual requirement, and the width of the air baffle ring 40 may be in different forms, for example, the air baffle ring 40 may have a fixed width, or the air baffle ring 40 may have a changing width. In the structures shown in FIG. 4 and FIG. 5, the air baffle ring 40 is provided with a fixed width, and the width of the air baffle ring 40 is d. Certainly, the air baffle ring 40 provided in this embodiment of this application may alternatively have a changing width. For example, the air baffle ring 40 is provided with a gradually changing width. For example, along an air flow direction in the housing 10, the width of the air baffle ring 40 gradually increases or gradually decreases. Alternatively, the width of the air baffle ring 40 is alternately wide and narrow.

Figure 6:
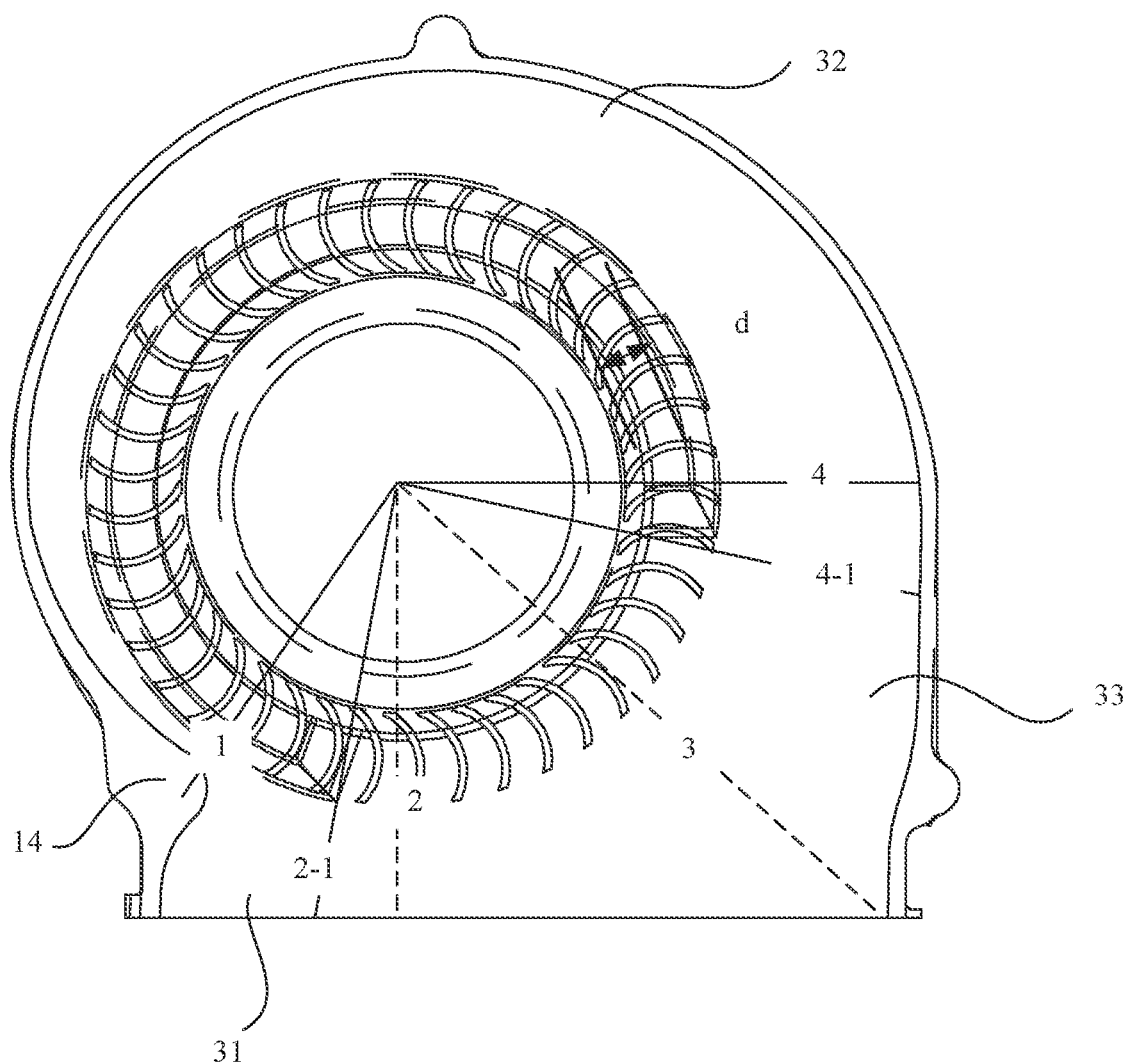
FIG. 6 is a schematic diagram of flow channel division for a centrifugal fan according to an embodiment of this application.

As shown in FIG. 6, an added air baffle ring 40 has a specific length. A start end of the air baffle ring 40 is located near a volute tongue air intake area 31, and a tail end of the air baffle ring 40 is located near a release area 33. A centrifugal fan in this application is first described. As shown in FIG. 6, the centrifugal fan has a volute tongue 14. The volute tongue 14 is located in a housing 10. As shown in FIG. 6, the volute tongue 14 is located in the volute tongue air intake area 31 in the housing 10. During disposition of the air baffle ring 40, one end of the air baffle ring 40 is located on one side on which a connection line between a center of the volute tongue 14 and a center of an impeller 20 is away from a pressurization area 32. As shown in FIG. 6, a line 1 is the connection line from the center of the impeller 20 to the center of the volute tongue 14, a line 2-1 is a start location of a C-shaped area, and a line 2 is a location line of the center perpendicular to a bottom side. During disposition of the air baffle ring 40, the start line 2-1 is located between 1 and 2. The tail end of the air baffle ring 40 is located in the release area 33. As shown in FIG. 6, a line 3 is a location line from the center to an outer side of the bottom side. During disposition, the line 3 and the line 2 may be at an angle of 45°. A line 4-1 is a termination line of the C-shaped area, and a line 4 is an outer-side location line. It can be seen from FIG. 6 that the termination line is located between 3 and 4. The foregoing sizes and parameters for start and end locations of the C-shaped area indicate merely an example of a parameter range. If the foregoing sizes and parameters are adjusted to a specific extent, an improvement effect may be reduced, but an objective effect can still be achieved. Such adjustment to a specific extent should still be considered as an example of a same design.

During disposition of the air baffle ring 40, air is blocked by the air baffle ring 40. In the foregoing descriptions, to reduce impact of the air baffle ring 40, an outer edge of the air baffle ring 40 is disposed to have a specific gradient, or disposed as a curved shape. In addition, one end, of the air baffle ring 40, close to the volute tongue 14 may further have a guide surface. That is, a start section of the air baffle ring 40 has a specific gradient. Using a thickness of the air baffle ring 40 as a reference for description, the thickness of the air baffle ring 40 gradually increases along a direction away from the start section, in order to implement smooth transition of air and improve smoothness of air circulation.

Figure 7:
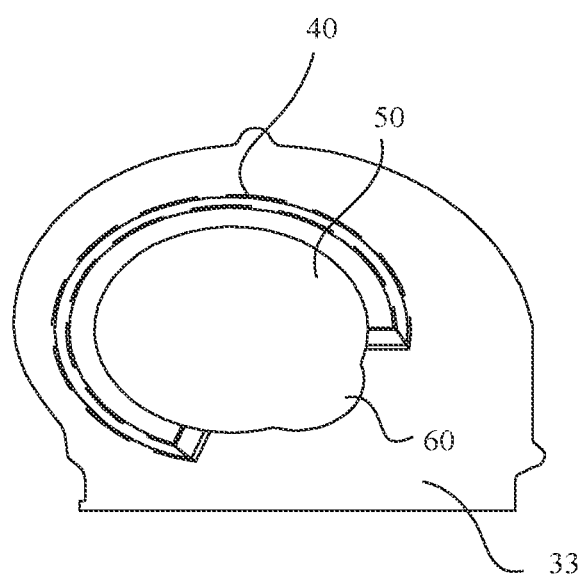
FIG. 7 is a schematic diagram of a notch of a centrifugal fan according to an embodiment of this application.

As shown in FIG. 7, an air pressure in a release area 33 is lower than that at an air inlet 50. Therefore, to increase an air intake volume, during disposition of the air inlet 50, a notch 60 corresponding to the release area 33 is disposed on an upper cover plate 11. The notch 60 communicates with the air inlet 50, such that air can directly enter the release area 33 through the notch 60, thereby increasing an air exhaust volume of an air outlet.

It can be learned from a centrifugal fan principle that, when the centrifugal fan is being used, it is expected that air can smoothly flow into the volute tongue air intake area 31, thereby reducing leakage in the pressurization area 32 as much as possible, and partially closing the pressurization area 32 can facilitate pressurization and increase a static pressure and kinetic energy of fluid. Additionally, the release area 33 requires a relatively high ventilation channel to reduce air flow inhalation resistance, such that fluid is smoothly inhaled into and exhausted from the area. It can be learned from the foregoing descriptions that, in the centrifugal fan provided in this application, the air baffle ring 40 that prevents air in the pressurization area 32 from leaking through the air inlet 50 is disposed in the housing 10. Moreover, the air baffle ring 40 is disposed around only a part of the air inlet 50, to prevent air in the pressurization area 32 from leaking, and separate air in the pressurization area 32 from air at the air inlet 50, thereby increasing a pressurization effect, and reducing a loss caused by mixture of an incoming air flow and a pressurization air flow in a volute. In this way, an air volume of the fan is increased, and noise of the fan is reduced. In addition, the air baffle ring 40 is disposed around a part of the air inlet 50, and no air baffle ring 40 is disposed in the release area 33 of the fan. In this part, a static pressure is relatively low, and an inhaled air flow is relatively large. Keeping a relatively large gap value between the housing 10 (cover plate) and the impeller 20 can reduce inflow resistance, and facilitate smooth entering of more air flows. Compared with a conventional design, the air baffle ring 40 that is disposed around a part of the air inlet 50 includes two parts: a relatively small gap of the pressurization area 32; and a relatively large gap of the release area 33. In the pressurization area 32, an air flow at the air inlet 50 can be effectively isolated from a pressurization air flow, and in the release area 33, the relatively large gap can ensure inhaling of more air flows. A combination of improvements of the two parts makes the design achieve a quite good improvement effect.

An embodiment of this application further provides a terminal. The terminal includes the terminal itself, a chip disposed in the terminal, and the centrifugal fan according to any one of the foregoing embodiments, where the centrifugal fan is disposed in the terminal and is configured to dissipate heat for the chip. It can be learned from a centrifugal fan principle that, when the centrifugal fan is being used, it is expected that air can smoothly flow into a volute tongue air intake area 31, thereby reducing leakage in a pressurization area 32 as much as possible, and partially closing the pressurization area 32 can facilitate pressurization and increase kinetic energy of fluid. Additionally, a release area 33 requires a relatively high ventilation channel to reduce air flow inhalation resistance, such that fluid is smoothly inhaled into and exhausted from the area. It can be learned from the foregoing descriptions that, in this embodiment of this application, the function requirements of the foregoing three different functional areas can be well met using a C-shaped channel of an upper cover plate 11. To be more specific, in each of the volute tongue air intake area 31 and the release area 33, a gap between an impeller 20 and the cover plate is relatively large, and a low pressure in this area facilitates air inhalation. In the pressurization area 32, a gap between the cover plate and the impeller 20 is relatively small, thereby keeping fluid partially closed.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A centrifugal fan, comprising:
a housing;
an impeller disposed in the housing;
an air inlet configured to cooperates with the impeller, wherein the air inlet is disposed on the housing;
a flow channel configured to cooperate with the impeller, wherein the flow channel is disposed in the housing, and wherein the flow channel comprises a pressurization area;
an air baffle ring configured to prevent air in the pressurization area from leaking through the air inlet, wherein the air baffle ring is disposed in the housing around a part of the air inlet, and wherein the air baffle ring protrudes toward one side of the impeller; and
a volute tongue disposed in the housing,
wherein a first end of the air baffle ring is located on one side on which a connection line between a center of the volute tongue and a center of the impeller is away from the pressurization area.

2. The centrifugal fan according to claim 1, wherein: the air baffle ring is C-shaped, wherein a first off-centered line from a start location of a C-shaped area of the air baffle ring to the center of the impeller is located between a first line and a second line, wherein; the first line is the connection line from the center of the impeller to the center of the volute tongue, wherein the second line is a second location line of the center of the impeller perpendicular to a bottom side, wherein a second off-centered line from an end location of the C-shaped area to the center of the impeller is located between a third line and a fourth line, wherein the third line is a third location line from the center of the impeller to an outer side of the bottom side, and wherein the fourth line is an outer-side location line perpendicular to the second line.

3. The centrifugal fan according to claim 1, wherein the air baffle ring and the housing are of an integrated structure.

4. The centrifugal fan according to claim 3, wherein the air baffle ring is a bending structure that surrounds the air inlet on the housing and that bends toward an interior of the housing.

5. The centrifugal fan according to claim 1, wherein along a direction parallel to the air inlet, a first maximum spacing between the air baffle ring and an edge of the air inlet is less than a second maximum spacing between a fan blade of the impeller and the air inlet.

6. The centrifugal fan according to claim 5, wherein the air baffle ring comprises a fixed width or a gradually changing width.

7. The centrifugal fan according to claim 6, further comprising an air outlet disposed on the housing, wherein a release area of the flow channel is close to the air outlet, wherein the release area is configured to communicates with the pressurization area, and wherein a second end of the air baffle ring is located on one side of the release area, close to the pressurization area.

8. The centrifugal fan according to claim 7, further comprising a notch corresponding to the release area, wherein the notch is disposed on the housing.

9. The centrifugal fan according to claim 7, wherein the first end of the air baffle ring is close to the volute tongue and has a guide surface.

10. The centrifugal fan according to claim 1, wherein the housing comprises:
an upper cover plate and a lower cover plate disposed opposite to each other, and
a side wall configured to connect the upper cover plate and the lower cover plate, wherein the upper cover plate, the lower cover plate, and the side wall form a cavity for accommodating the impeller, wherein the air inlet is disposed on the upper cover plate and/or the lower cover plate, and wherein the air baffle ring is fixedly disposed on the upper cover plate and/or the lower cover plate.

11. The centrifugal fan according to claim 10, wherein the air baffle ring is stamped or bent on the upper cover plate.

12. A terminal, comprising:
a chip disposed in the terminal; and
a centrifugal fan disposed in the terminal and configured to dissipate heat for the chip, wherein the centrifugal fan comprises:
a housing;
an impeller disposed in the housing;
an air inlet configured cooperate with the impeller, wherein the air inlet is disposed on the housing;
a flow channel configured to cooperate with the impeller, wherein the flow channel is disposed in the housing and comprises a pressurization area;
an air baffle ring configured to prevent air in the pressurization area from leaking through the air inlet, wherein the air baffle ring is disposed in the housing around a part of the air inlet, and wherein the air baffle ring protrudes toward one side of the impeller; and
a volute tongue disposed in the housing, and
wherein a first end of the air baffle ring is located on one side on which a connection line between a center of the volute tongue and a center of the impeller is away from the pressurization area.

13. The terminal according to claim 12, wherein the air baffle ring is C-shaped, wherein a first off-centered line from a start location of a C-shaped area of the air baffle ring to the center of the impeller is located between a first line and a second line, wherein the first line is the connection line from the center of the impeller to the center of the volute tongue, wherein the second line is a location line of the center of the impeller perpendicular to a bottom side, wherein a second off-centered line from an end location of the C-shaped area to the center of the impeller is located between a third line and a fourth line, wherein the third line is a location line from the center of the impeller to an outer side of the bottom side, and wherein the fourth line is an outer-side location line perpendicular to the second line.

14. The terminal according to claim 12, wherein the air baffle ring and the housing are of an integrated structure.

15. The terminal according to claim 14, wherein the air baffle ring is a bending structure that surrounds the air inlet on the housing and that bends toward an interior of the housing.

16. The terminal according to claim 12, wherein along a direction parallel to the air inlet, a first maximum spacing between the air baffle ring and an edge of the air inlet is less than a second maximum spacing between a fan blade of the impeller and the air inlet.

17. The terminal according to claim 16, wherein the air baffle ring comprises a fixed width or a gradually changing width.

18. The terminal according to claim 17, further comprising an air outlet disposed on the housing, wherein release area of the flow channel is close to the air outlet, wherein the release area communicates with the pressurization area, and wherein a second end of the air baffle ring is located on one side of the release area, close to the pressurization area.

19. The centrifugal fan according to claim 12, wherein the housing comprises:
an upper cover plate and a lower cover plate disposed opposite to each other; and
a side wall configured to connect the upper cover plate and the lower cover plate, wherein the upper cover plate, the lower cover plate, and the side wall form a cavity for accommodating the impeller, wherein the air inlet is disposed on the upper cover plate and/or the lower cover plate, and wherein the air baffle ring is fixedly disposed on the upper cover plate and/or the lower cover plate.

20. The centrifugal fan according to claim 19, wherein the air baffle ring is directly formed on the upper cover plate through stamping or bending.

* * * * *

UNITED STATES PATENT AND TRADEMARK OFFICE
CERTIFICATE OF CORRECTION

PATENT NO. : 11,719,256 B2
APPLICATION NO. : 17/408278
DATED : August 8, 2023
INVENTOR(S) : Jianliang Wang et al.

Page 1 of 1

It is certified that error appears in the above-identified patent and that said Letters Patent is hereby corrected as shown below:

In the Claims

Claim 2, Column 10, Line 30: "claim 1, wherein: the" should read "claim 1, wherein the"

Claim 2, Column 10, Line 34: "line, wherein: the" should read "line, wherein the"

Signed and Sealed this
Twenty-sixth Day of September, 2023

Katherine Kelly Vidal
*Director of the United States Patent and Trademark Office*